(12) United States Patent
Hayashi et al.

(10) Patent No.: US 8,655,077 B2
(45) Date of Patent: *Feb. 18, 2014

(54) IMAGE-CAPTURING AND DATA EXTRACTION DEVICE

(71) Applicant: Nikon Corporation, Tokyo (JP)

(72) Inventors: Masaki Hayashi, Kawasaki (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,250

(22) Filed: Feb. 28, 2013

(65) Prior Publication Data

US 2013/0176461 A1 Jul. 11, 2013

Related U.S. Application Data

(60) Continuation of application No. 13/067,843, filed on Jun. 29, 2011, now abandoned, which is a continuation of application No. 12/216,412, filed on Jul. 3, 2008, now abandoned, application No. 13/781,250, which is a continuation of application No. 11/150,216, filed on Jun. 13, 2005, now abandoned, and a division of application No. 09/987,419, filed on Nov. 14, 2001, now Pat. No. 6,944,345.

(30) Foreign Application Priority Data

Nov. 15, 2000 (JP) .................................. 2000-348114

(51) Int. Cl.
 *G06K 9/66* (2006.01)
 *G06K 9/00* (2006.01)

(52) U.S. Cl.
 USPC ....................................................... 382/190

(58) Field of Classification Search
 USPC ......... 382/172, 189, 190, 195, 214, 232, 282; 348/207, 220; 375/240.01, 240.08; 396/287, 290, 291
 See application file for complete search history.

(56) References Cited

U.S. PATENT DOCUMENTS

| 4,882,601 A | 11/1989 | Taniguchi et al. |
| 5,687,409 A | 11/1997 | Miyamoto |

(Continued)

FOREIGN PATENT DOCUMENTS

| JP | A-01-105221 | 4/1989 |
| JP | A-11-239291 | 8/1999 |

(Continued)

OTHER PUBLICATIONS

English-language Translation of Japanese Office Action mailed Jan. 19, 2010.

*Primary Examiner* — Amir Alavi
(74) *Attorney, Agent, or Firm* — Oliff PLC

(57) ABSTRACT

An image-capturing device including an image-capturing element, a data extraction device, a recording device, a reproduction device, and a display control device is provided. The image-capturing element captures an image of a photographic subject and outputs image data. The data extraction device extracts data corresponding to a region designated in advance within the image data outputted from the image-capturing element. The recording device records the extracted data and the image data into a recording medium individually. The reproduction device reads out the extracted data from the recording medium. The display control device outputs an image signal to a display device, so as to display an image according to the extracted data read out by the reproduction device.

10 Claims, 8 Drawing Sheets

(56) References Cited

U.S. PATENT DOCUMENTS

| | | | |
|---|---|---|---|
| 5,715,485 A | 2/1998 | Murakami et al. | |
| 5,729,327 A | 3/1998 | Narita | |
| 5,995,649 A | 11/1999 | Marugame | |
| 6,246,837 B1 | 6/2001 | Kageyama et al. | |
| 6,331,853 B1 | 12/2001 | Miyashita | |
| 6,944,345 B2 * | 9/2005 | Hayashi et al. | 382/232 |
| 6,987,535 B1 * | 1/2006 | Matsugu et al. | 348/239 |
| 7,071,974 B2 | 7/2006 | Tojo | |
| 7,145,597 B1 * | 12/2006 | Kinjo | 348/222.1 |
| 7,532,361 B2 * | 5/2009 | Yano | 358/3.05 |
| 7,593,038 B2 * | 9/2009 | Ochiai | 348/208.6 |
| 7,768,565 B2 * | 8/2010 | Hibino | 348/333.01 |
| 2006/0012690 A1 * | 1/2006 | Nakamura et al. | 348/231.6 |
| 2007/0109399 A1 * | 5/2007 | Sekimoto et al. | 348/36 |
| 2007/0177818 A1 | 8/2007 | Teshima et al. | |
| 2008/0303916 A1 * | 12/2008 | Hayashi et al. | 348/222.1 |
| 2011/0261230 A1 * | 10/2011 | Hayashi et al. | 348/231.99 |

FOREIGN PATENT DOCUMENTS

| | | |
|---|---|---|
| JP | A-2000-125178 | 4/2000 |
| JP | A-2000-278578 | 10/2000 |

* cited by examiner

FIG.1
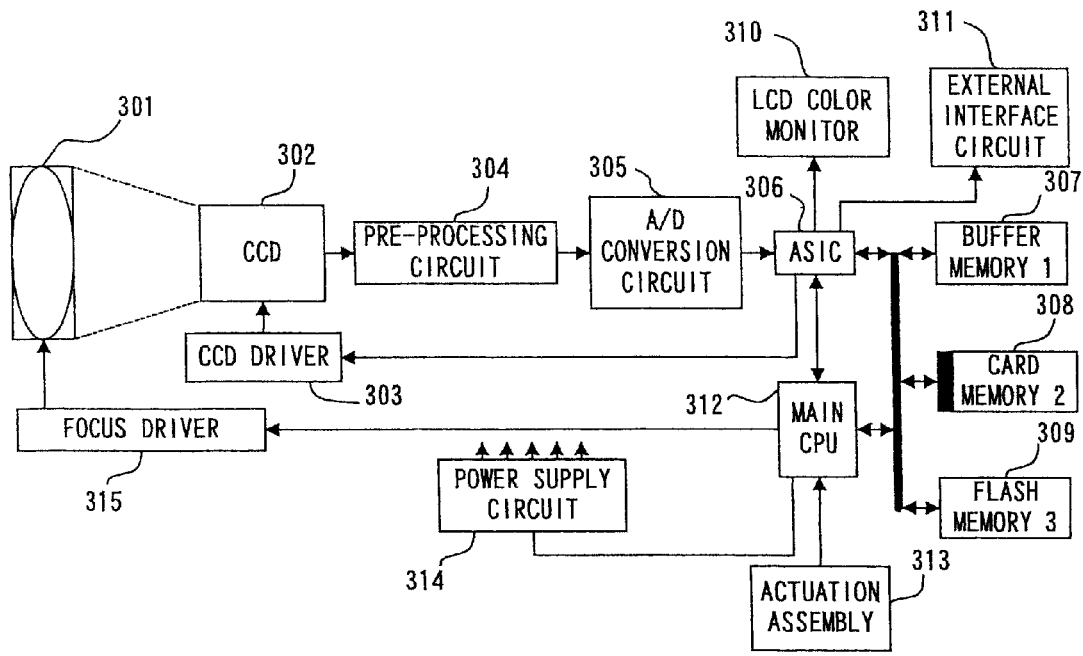
FIG.2  IMAGE CUTOUT REGION
       FOCUS AREA BOUNDARY
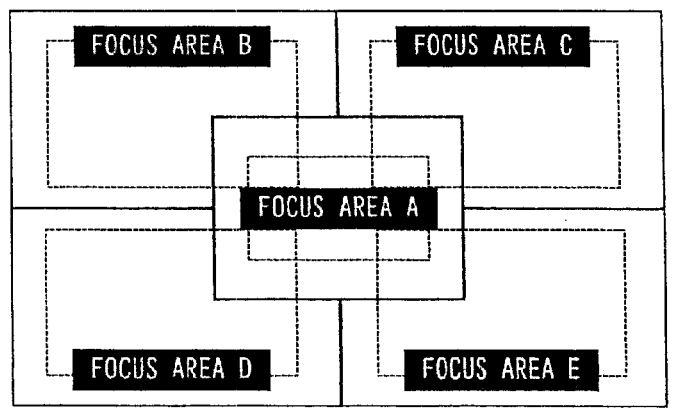

IMAGE-CAPTURING AND DATA EXTRACTION DEVICE

This is a Continuation of application Ser. No. 13/067,843 filed Jun. 29, 2011, which is a Continuation of application Ser. No. 12/216,412 filed Jul. 3, 2008, which is a Continuation of application Ser. No. 11/150,216 filed Jun. 13, 2005, which is a Division of application Ser. No. 09/987,419 filed Nov. 14, 2001, now U.S. Pat. No. 6,944,345 issued Sep. 13, 2005. The disclosures of the prior applications are hereby incorporated by reference herein in their entirety.

INCORPORATION BY REFERENCE

The disclosure of the following priority application is herein incorporated by reference:

Japanese Patent Application No. 2000-348114, filed Nov. 15, 2000.

BACKGROUND OF THE INVENTION

1. Field of the Invention

The present invention relates to an image-capturing device which records a photographic image as electronic data upon a recording medium.

2. Description of the Related Art

A type of electronic still camera or the like is per se known which is equipped with an LCD monitor, and which reproduces image data recorded upon a recording medium by displaying it upon the LCD monitor. Generally, an LCD monitor which is fitted to this type of electronic still camera has a smaller number of display pixels than the number of data pixels in the image data. Because of this, when displaying upon the LCD monitor a reproduced image from image data, the image data is displayed after having been subjected to a subsampling or culling procedure at some certain predetermined ratio. When the image data has been thus processed by subsampling it and displaying it upon the LCD monitor, it becomes difficult to check finely detailed portions of the photographic image from the reproduced image. In particular, in order to check whether or not the focus is accurately set upon a desired subject for photography, it is necessary to display the portion of the image data in which this desired subject for photography is included upon the screen of the LCD monitor without performing any subsampling processing upon the region which includes it.

In order to display a portion of the region of the photographic image recorded upon the recording medium upon the LCD monitor, it is necessary to designate to the electronic still camera which portion of the photographic image is to be displayed. Furthermore, in the case that the image data which is recorded upon the recording medium is image data which has been subjected to a compression process, it is necessary to perform the decompression process upon the image data before displaying it upon the LCD monitor. Due to this, when reading out the image data which is recorded upon the recording medium in order to check the focus state, it has not been possible immediately to display an image of the region which is to be checked upon the LCD monitor.

SUMMARY OF THE INVENTION

The objective of the present invention is to provide an image-capturing device which is capable of displaying a predetermined region of image data which is recorded upon a recording medium.

In order to attain the above objective, the first image-capturing device according to the present invention comprises: an image-capturing element which captures an image of a photographic subject and outputs image data; a data extraction device which extracts data corresponding to a region designated in advance within the image data outputted from the image-capturing element; a recording device which records the extracted data and the image data into a recording medium individually; a reproduction device which reads out the extracted data from the recording medium; and a display control device which outputs an image signal to a display device, so as to display an image according to the extracted data read out by the reproduction device.

The second image-capturing device according to the present invention comprises: an image-capturing element which captures an image of a photographic subject and outputs image data; an information generation device which generates information which specifies a position of a region designated in advance; a recording device which records the information from the information generation device and the image data outputted from the image-capturing element into a recording medium individually; a reproduction device which reads out the information and the image data from the recording medium; and a display control device which outputs an image signal to a display device, so as to display an image according to a portion of the image data corresponding to the information which is read out by the reproduction device.

In this second image-capturing device, it is preferred that: a data extraction device which extracts data corresponding to the region designated in advance within the image-data outputted from the image-capturing element; and a compression processing device which performs a predetermined compression process upon the image data, are further provided, and: the recording device records the extracted data and the image data after compression processing into the recording medium individually when the compression processing device performs the compression process, and records the information which specifies the position of the region and the image data without compression into the recording medium individually when the compression processing device does not perform the compression process; and the display control device outputs an image signal to the display device so as to display an image according to the extracted data when the extracted data is read out by the reproduction device, and outputs an image signal to the display device so as to display an image according to a portion of the image data which corresponds to the information when the information is read out by the reproduction device. In this case, it is preferred that a decision device which decides whether or not, when the compression processing device performs the compression process, a compression ratio of the image data is higher than a predetermined value, is further provided, and: the recording device records the information which specifies the position of the region and the image data after the compression process into the recording medium individually when it is decided by the decision device that the compression ratio is higher than the predetermined value, and records the extracted data and the image data after the compression process into the recording medium individually when it is decided by the decision device that the compression ratio is not higher than the predetermined value; the reproduction device performs a decompression process, if the read out image data has been subjected to the compression process; and the display control device outputs an image signal to the display device so as to display an image according to a portion of the image data after the decompression process corresponding to the information when the information is read out by the reproduction device, and outputs an image signal to the display device so as to display an image according to the extracted data when the extracted data is read out by the reproduction device. Also, it is preferred that: the compression processing device performs the compression process upon the extracted data and upon the image data; the recording device records the extracted data after the compression process and the image data into the recording medium individually when the compression processing device performs the compression process; and the reproduction device performs the decompression process, if the extracted data which has been read out has been subjected to the compression process.

The third image-capturing device according to the present invention comprises: an image-capturing element which captures an image of a photographic subject and outputs image data; a data extraction device which extracts data corresponding to a region designated in advance within the image data outputted from the image-capturing element; and a recording device which records the extracted data and the image data into a recording medium individually.

In the first and third image-capturing devices, it is preferred that the data extraction device extracts a number of items of data approximately equal to a number of display dots of the display device which displays the image according to the extracted data.

In the above image-capturing devices, it is preferred that the region which is designated in advance is a region which is used for focusing.

An image display control method according to the present invention comprises: a reproduction process which reads out at least one of extracted data, which have been extracted from image data which was obtained by an image-capturing device, so as to correspond to a region designated in advance and recorded, and a pair of information specifying a position of the region and the image data; and a display control process which controls a display device so as to display an image according to the extracted data when the extracted data is read out by the reproduction process, and to display an image according to a portion of the image data corresponding to the information when the pair of the information and the image data are read out by the reproduction process.

A computer-readable computer program product according to the present invention contains an image display program. The image display program comprises: a reproduction process which reads out at least one of extracted data, which have been extracted from image data which was obtained by an image-capturing device, so as to correspond to a region designated in advance and recorded, and a pair of information specifying a position of the region and the image data; and a display control process which controls a display device so as to display an image according to the extracted data when the extracted data is read out by the reproduction process, and to display an image according to a portion of the image data corresponding to the information when the pair of the information and the image data are read out by the reproduction process.

This computer program product is a recording medium on which the image display program is recorded.

Or, this computer program product is a carrier wave in which the image display program is embodied as a data signal.

An image-capturing control method according to the present invention comprises: outputting image data after capturing an image of a photographic subject by an image-capturing element; extracting data corresponding to a region designated in advance within the outputted image data; recording the extracted data and the image data into a recording medium individually; reading out the extracted data from the recording medium when reproducing; and controlling a display device so as to display an image according to the read out extracted data.

Another image-capturing control method according to the present invention comprises: outputting image data after capturing an image of a photographic subject by an image-capturing element; generating position information which specifies a position of a region designated in advance; recording the position information and the image data outputted from the image-capturing element into a recording medium individually; reading out the position information and the image data when reproducing; and controlling a display device so as to display an image according to a portion of the image data corresponding to the read out position information.

Another image-capturing control method according to the present invention comprises: outputting image data after capturing an image of a photographic subject by an image-capturing element; extracting data corresponding to a region designated in advance within the outputted image data; and recording the extracted data and the image data into a recording medium individually.

BRIEF DESCRIPTION OF THE DRAWINGS

FIG. 1 is a block diagram showing the overall structure of an electronic still camera according to a first preferred embodiment of the present invention.

FIG. 2 is a figure showing several focusing areas which are provided within the photographic field of the FIG. 1 camera.

FIG. 3 is a figure showing a focus area selection switch 313a.

DESCRIPTION OF THE PREFERRED EMBODIMENTS

Figure 3:
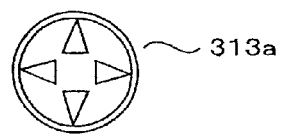

In the following, several preferred embodiments of the present invention will be described with reference to the figures.

Embodiment One

FIG. 1 is a block diagram showing the overall structure of an electronic still camera according to a first preferred embodiment of the present invention. The electronic still camera shown in this figure comprises a photographic lens 301, a CCD 302, a CCD driver 303, a pre-processing circuit 304, an A/D conversion circuit 305, an ASIC for image processing 306, a buffer memory 307, a card memory 308, a flash memory 309, an LCD color monitor 310, an external interface circuit 311, a main CPU 312, an actuation assembly 313, a power supply circuit 314, and a focus driver 315. The actuation assembly 313 includes a half press switch and a full press switch which are operated by a release button not shown in the figure, a mode changeover switch which changes over between a recording mode and a reproduction (or replay) mode, and a focus area selection switch and a menu switch which will be described hereinafter. When each of these switches in the actuation assembly 313 is actuated, an actuation signal from said switch is despatched to the CPU 312. Here, the recording mode is an operational mode in which this electronic still camera records a photographic image, while the reproduction mode is an operational mode in which it reproduces an image which has previously been recorded.

—The Recording Mode—

When the mode changeover switch of the actuation assembly 313 is actuated to the recording mode side, the CPU 312 starts the execution of a program for the recording mode. When a half press actuation signal from the half press switch is inputted to the CPU 312, the CPU 312 outputs a control signal for the ASIC for image processing 306. This ASIC for information processing 306 drive controls the CCD 302, which is an image-capturing device, via the CCD driver 303. This CCD driver 303 controls the operational timing for the CCD 302 to accumulate charge, and for reading out this accumulated charge. Furthermore, the CPU 312 outputs a drive signal to the focus driver 315 based upon the focus adjustment state of the photographic lens 301 which is detected by a focus adjustment state detection procedure which will be described hereinafter. This focus driver 315 performs focus adjustment by driving a focusing lens (not particularly shown) within the photographic lens 301. Furthermore, the CPU 312 performs a predetermined exposure calculation, based upon the brightness of the photographic subject as detected by a photometric device not shown in the figure.

When, after the actuation signal from the half press switch, a full press actuation signal from the full press switch is inputted to the CPU 312, an image of the photographic subject is formed by the photographic lens 301 upon the CCD 302. The CCD 302 accumulates signal charges according to the brightness of the light from the photographic subject which is incident upon said CCD 302. These signal charges which are accumulated by the CCD 302 are emitted according to a timing signal from the CCD driver 303 and are inputted to the pre-processing circuit 304. This pre-processing circuit 304 comprises an AGC circuit and a CDS circuit, and performs analog signal processing such as amplifying the analog image signal, reduction of noise, black level adjustment, and the like. The A/D conversion circuit 305 converts this analog image signal after analog processing into a digital signal. This signal converted into digital format is fed to the ASIC for image processing 306, which performs image pre-processing such as outline compensation and gamma correction, color temperature adjustment, color space conversion processing, and the like. After this pre-processing, the image data is temporarily stored in a memory 307 which is a buffer memory.

The image data which is stored in the memory 307 after image pre-processing is processed into image data for display by the ASIC for image processing 306, and is displayed as the result of photography upon an external monitor such as the LCD color monitor 310. During this image data processing, the buffer memory 307 is utilized as a working memory.

The LCD color monitor 310 is a small sized liquid crystal display device which is provided to the electronic still camera, and it has a smaller number of display pixels than the number of pixels in the image captured by the CCD 302. Thus, when displaying the image of the photographic subject which has been captured by the CCD 302 upon the LCD color monitor 310, the pixel data from the CCD 302 are subsampled or thinned out at a predetermined ratio which corresponds to the display resolution of the LCD color monitor 310, so as to be processed into image data for display.

Furthermore, the ASIC for image processing 306 performs format processing (image post-processing) for JPEG compression upon the image data which have been subjected to the above described image pre-processing. This ASIC for image processing 306 performs data compression at a predetermined compression ratio according to the JPEG method upon the image data after image post-processing. After a predetermined file name has been appended to the image data which has been subjected to data compression according to the JPEG method, it is recorded in the card memory 308 which is a removable non volatile recording medium (a PC card or a CF card or the like) such as a flash memory or the like.

The program for controlling the CPU 312 to perform the above described processing is stored in the flash memory 309. The CPU 312 reads in the program from the flash memory 309 and executes this program, using the buffer memory 307 as a working memory.

The power supply circuit 314 comprises a DC/DC converter, and supplies a predetermined power supply voltage to each of the blocks described above. The external interface circuit 311 is a circuit which sends and receives image data between this camera and an external device such as a personal computer or a monitor or the like.

As described above, a focus area selection switch is included in the actuation assembly 313. The focus area is an area which automatically detects (auto-focus AF) the adjustment state of the focal position of the photographic lens 301. FIG. 2 is a figure showing several focusing areas which are provided within the photographic field of the camera according to the embodiment 1. As shown in this figure, any of five focus areas can be set: a focus area A which is positioned at the center of the photographic field; a focus area B which consists of the upper left portion of the photographic field with the portion thereof which overlaps the central focus area A eliminated; a focus area C which consists of the upper right portion of the photographic field with the portion thereof which overlaps the central focus area A eliminated; a focus area D which consists of the lower left portion of the photographic field with the portion thereof which overlaps the central focus area A eliminated; and a focus area E which consists of the lower right portion of the photographic field with the portion thereof which overlaps the central focus area A eliminated.

The focus area selection switch is used for choosing which of the five focus areas described above will be utilized for detection the focal position adjustment state. FIG. 3 is a figure showing this focus area selection switch 313a. This focus area selection switch 313a outputs an actuation signal which specifies in which direction it is actuated—upwards, downwards, leftwards, or rightwards. When, in the state in which the focus area A of FIG. 2 is selected, the focus area selection switch 313a is actuated upwards and rightwards, the CPU 312 selects the focus area C; and, when in the state in which the focus area A of FIG. 2 is selected, the focus area selection switch 313a is actuated upwards and leftwards, the CPU 312 selects the focus area B. Similarly when, in the state in which the focus area A of FIG. 2 is selected, the focus area selection switch 313a is actuated downwards and rightwards, the CPU 312 selects the focus area E; and, when in the state in which the focus area A of FIG. 2 is selected, the focus area selection switch 313a is actuated downwards and leftwards, the CPU 312 selects the focus area D. Furthermore when, in the state in which the focus area D or the focus area E is selected, the focus area selection switch 313a is actuated upwards, the CPU 312 selects the focus area A; and when, in the state in which the focus area B or the focus area C is selected, the focus area selection switch 313a is actuated downwards, the CPU 312 likewise selects the focus area A. It should be understood that the focus area selection switch 313a is also actuated for frame advance and frame backup during image reproduction, as will be explained hereinafter, and is also utilized for menu selection and decision.

The focus area information which is set by the focus area selection switch 313a is stored within the CPU 312, and is read out from the CPU 312 when an actuation signal is inputted to the CPU 312 from the half press switch. The CPU 312 outputs commands to the ASIC for image processing 306 so as to display a frame upon the LCD color monitor 310 which informs the photographer of the focus area which has been selected. This displayed frame consists of an intensified display of the outline of the focus area which is selected. It should be understood that the display of this frame which appears in order to indicate the focus area when the half press actuation signal is received, is terminated after a predetermined time period has elapsed from the start of reception of the half press actuation signal.

The A/F operation is performed as will now be described. The CPU 312, detects the contrast from the data portion, from among the image data which is captured by the CCD 302 and is stored in the memory 307, which corresponds to the focus area which is set. And the CPU 312 then detects the adjustment state of the focal position of the photographic lens 301 based upon the contrast which has been detected. Generally, the relationship between the pixel positions upon the CCD 302 and the pixel output values defines a curve which corresponds to the image of the photographic subject, and the greater is the change of the curve, the greater is the contrast of the image of the photographic subject. Accordingly, the CPU 312 performs focus adjustment by detecting the adjustment state of the focal position, and by driving the focus driver 315 and thereby adjusting the focal position of the photographic lens 301, according to a so called hill climbing method (scanning and contrast detecting method of AF), so as to maximize the contrast of the image of the photographic subject.

—The Reproduction Mode—

When the mode changeover switch of the actuation assembly 313 is actuated to the reproduction mode side, the CPU 312 starts the execution of a program for the reproduction mode. The image data item among the recorded image data which was recorded the last is read out into the CPU 312, if image data are recorded in the card memory 308. After the read out image data is transferred to the buffer memory 307, the compressed data is subjected to decompression processing by the ASIC for image processing 306. The data after decompression processing is processed by the ASIC for image processing 306 into image data for display, and is displayed upon the LCD color monitor 310 as a reproduced image. Data which is not compressed is processed by the ASIC for image processing 306 just as it is into image data for display, and is displayed upon the LCD color monitor 310 as a reproduced image.

If, when displaying the reproduced image upon the LCD color monitor 310, the focus area selection switch 313a is actuated in the leftwards direction, then the CPU 312 reads out from the card memory 308 the image data which was recorded one frame previously to the image data which is currently being displayed upon the CPU 312 (i.e., the actuation in the leftward direction during display of a reproduced image functions as frame reverse actuation). The read out image data is processed into image data for display by the ASIC for image processing 306 and is displayed upon the LCD color monitor 310. In the same manner, if, when displaying the reproduced image upon the LCD color monitor 310, the focus area selection switch 313a is actuated in the rightward direction, then the CPU 312 reads out from the card memory 308 the image data which was recorded one frame later than the image data which is currently being displayed upon the CPU 312 (i.e., the actuation in the rightward direction during display of a reproduced image functions as frame forward actuation). Again, the read out image data is processed into image data for display by the ASIC for image processing 306 and is displayed upon the LCD color monitor 310. In this manner, during reproduction processing, frame advance and frame reverse for the reproduced image are performed by using the focus area selection switch 313a.

Just as the LCD color monitor 310 has a smaller number of display pixels than the number of pixels in the image captured by the CCD 302, it also has a smaller number of display pixels than the number of pixels in the image data which is stored in the card memory 308. Thus, when displaying the entire recorded image for one frame upon the LCD color monitor 310, the image data which are read out from the card memory 308 are subsampled at a predetermined ratio which corresponds to the display resolution of the LCD color monitor 310, so as to be processed into image data for display. Here, the image according to the image data for display which is processed using the entire image data for one frame recorded in the card memory 308 will be termed the main image.

In the reproduction mode it is possible, not to subsample the image data which is read out from the card memory 308 according to the display resolution of the LCD color monitor 310, but rather to perform display by processing a portion of the image data which has been read out just as it is into image data for display. The partial image which is displayed upon the LCD color monitor 310 is the image portion which corresponds to the focus area which was selected when recording this recorded image in the card memory 308. The image generated from the image data for display which is processed using the portion which corresponds to the original focus area in this manner will be termed the cutout image.

The cutout region for the cutout image is a rectangular region which is positioned in the vicinity of the central point of the relevant focus area shown in FIG. 2 and described above, and in that figure these cutout regions are shown by the broken lines. The image data in the cutout regions are displayed upon the LCD color monitor 310 without performing any subsampling procedure. In other words, the number of data elements in each of the cutout regions shown by the broken lines in FIG. 2 is the same as the number of display pixels upon the LCD color monitor 310. During reproduction mode, the setting which determines whether the reproduced image will be the main image or will be one of these cutout images is performed by using a menu procedure which will now be described.

—Menu Processing—

Figure 4A:
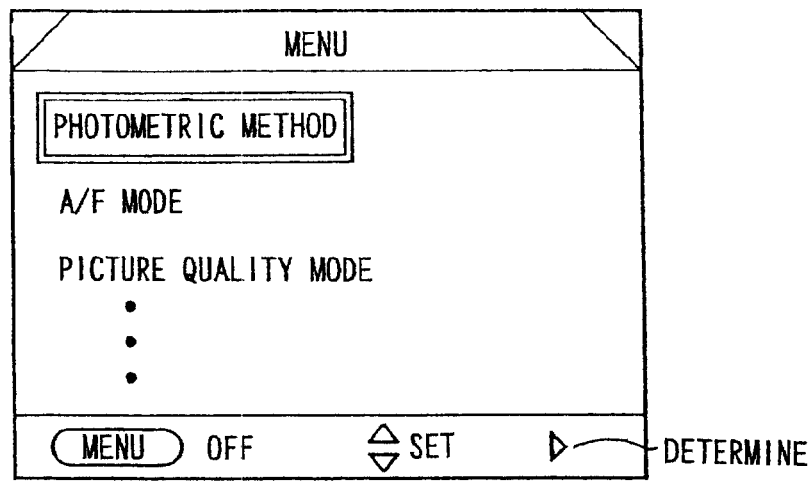
FIG. 4A is a figure for explanation of a menu setting screen.
Figure 4B:
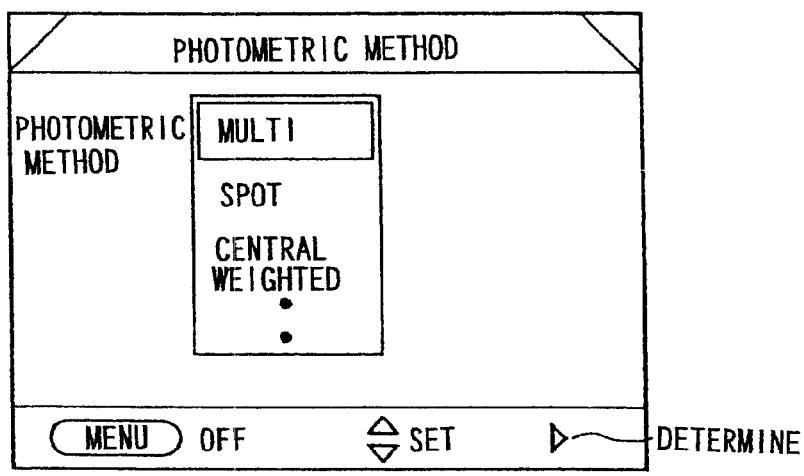
FIG. 4B is a figure showing a menu setting screen which is related to the photometric method.
Figure 4C:
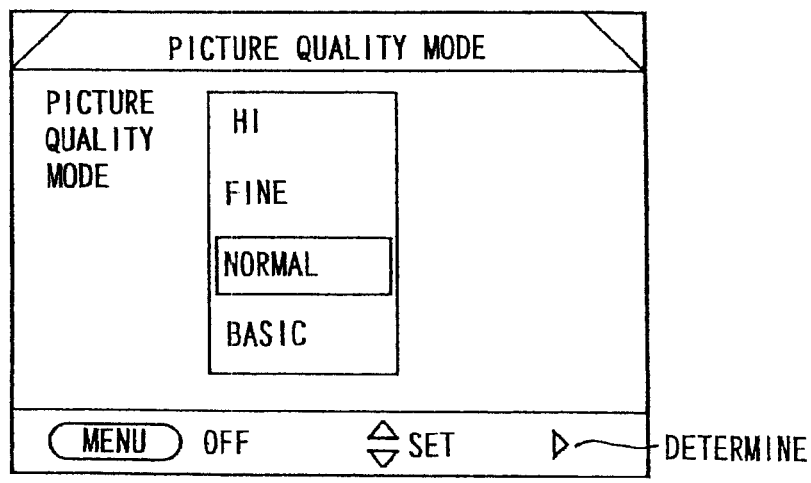
FIG. 4C is a figure showing a menu setting screen which is related to picture quality.

The detailed settings for this electronic still camera are established by performing menu processing. As described above, a menu switch is included within the actuation assembly 313 for initiating this menu processing. FIG. 4 is a figure for explanation of various menu setting screens which are displayed upon the LCD color monitor 310 of this electronic still camera. When the menu switch is actuated, the menu setting screen shown in FIG. 4A is displayed upon the LCD color monitor 310. For example, the item "photometric method" may be selected from the menu by actuating the focus area selection switch 313a in the upward and downward directions (actuation in the upwards and downwards directions during menu processing functions as menu selection actuation). When the item "photometric method" is determined upon by actuating the focus area selection switch 313a in the rightward direction (actuation in the rightward direction during menu processing functions as menu determination actuation), the menu setting screen related to photometric method shown in FIG. 4B is displayed upon the LCD color monitor 310.

By "photometric method" is meant a setting for where in the photographic field the brightness of the photographic subject is to be measured for the CPU 312 to perform exposure calculation. Selections for "photometric method" include "multi" which means that exposure calculation is to be performed using light intensity values that have been measured over the photographic field by subdividing it into a predetermined number of regions, "spot" which means that exposure calculation is performed using light intensity values that have been measured in the vicinity of a predetermined region within the photometric field, "center-weighted" which means that exposure calculation is performed using light intensity values that have been measured over the portions of the photographic field while appropriately weighting the central part of the photographic field, and the like.

When, in the state in which the menu setting screen of FIG. 4A is being displayed upon the LCD color monitor 310, the item "picture quality mode" is selected from this menu and is determined upon, a menu setting screen related to picture quality mode like that shown in FIG. 4O is displayed upon the display LCD color monitor 310. By "picture quality" is meant a setting for the data compression ratio when recording the above described image data in the card memory 308. This menu includes a setting "HI" in which the image data is not compressed but is recorded just as it is, a setting "FINE" in which compression is performed so as to reduce the size of the image data to about ¼ of the original, a setting "NORMAL" in which compression is performed so as to reduce the size of the image data to about ⅛ of the original, and a setting "BASIC" in which compression is performed so as to reduce the size of the image data to about 1/16 of the original.

Figure 5A:
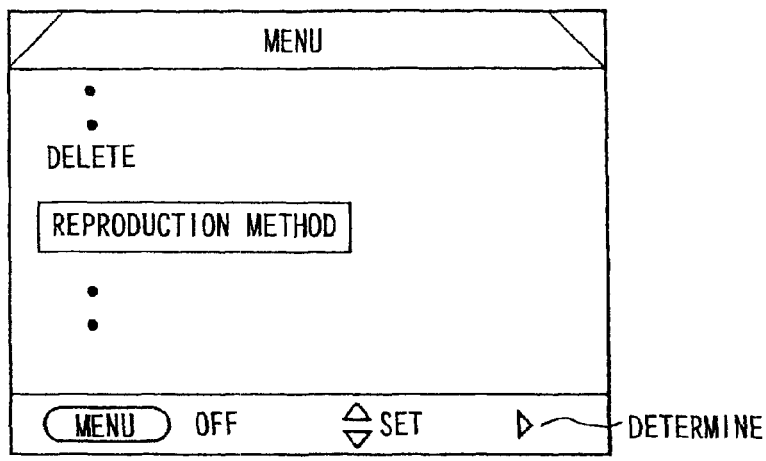
FIG. 5A is a figure for explanation of another menu setting screen.
Figure 5B:
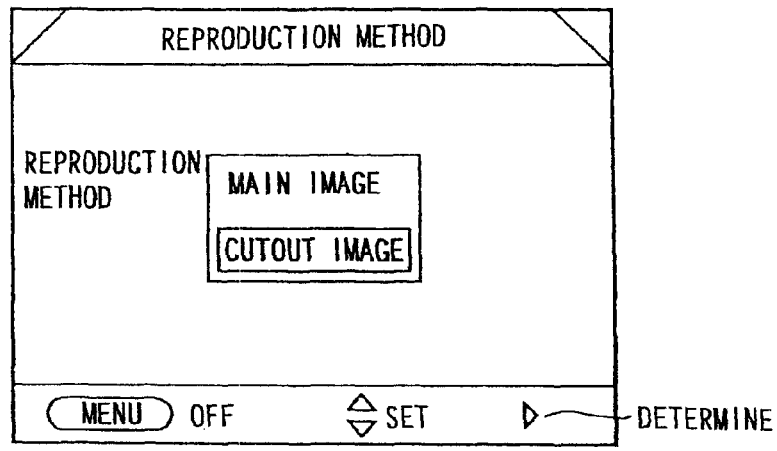
FIG. 5B is a figure showing a menu setting screen which is related to reproduction method.

When, in the state in which the menu setting screen of FIG. 4A is being displayed, the focus area selection switch 313a is actuated in the upward and downward direction, a menu screen like that shown in FIG. 5A appears upon the display LCD color monitor 310 with items which are related to the reproduction procedure. For example, the item "reproduction method" may be selected from this menu by actuating the focus area selection switch 313a in the upward and downward direction. When this item "reproduction method" is determined upon by actuating the focus area selection switch 313a in the rightward direction, then a menu screen related to reproduction method like that shown in FIG. 5B appears upon the display LCD color monitor 310.

By "reproduction method" is meant a setting for whether, during the above described reproduction image display, the main image is to be displayed, or alternatively a cutout image is to be displayed. During reproduction processing, this electronic still camera either displays the main image or a cutout image, according to the "reproduction method" which is set by this menu processing.

During menu processing, the operator selects the desired item upon a menu by actuating the focus area selection switch 313a in the upward and the downward direction, and determines upon the current selection by actuating the focus area selection switch 313a in the rightward direction. The CPU 312 terminates menu processing when the menu switch is actuated for a second time by the operator.

With this electronic still camera according to the first preferred embodiment of the present invention, when recording image data in the card memory 308 in the recording mode, information for use in cutout image display is recorded in the card memory 308 along with each frame of image data. This information for use in cutout image display can be either (1) the image data itself for the cutout region; or (2) information which specifies the position of the image data for the cutout region within the image data which is recorded in the card memory 308. If the image data for one frame is being compressed for recording in the card memory 308, the electronic still camera records the above described type of data (1) as information for displaying the cutout image, while, if the image data for one frame is being recorded in the card memory 308 without compression, the electronic still camera records the above described type of data (2) as information for displaying the cutout image. The information which specifies the position of the image data for the cutout region within the image data which is recorded in the card memory 308 may be, for example, the memory address at which is stored the image data for the cutout region.

When a reproduced image is to be displayed upon the LCD color monitor 310 in the reproduction mode, if the main image is to be displayed, one frame of the compressed image data is read out from the card memory 308, and is displayed upon the LCD color monitor 310 after decompression processing. On the other hand, if a cutout image is to be displayed, if (1) cutout image data is recorded in the card memory 308, then this cutout image data is read out from the card memory 308 and is displayed; while, if (2) information for displaying the cutout image is recorded in the card memory 308, then the data among one frame of non-compressed image data which is extracted based upon the information for displaying the cutout image is read out from the card memory 308 and is displayed.

Figure 6:
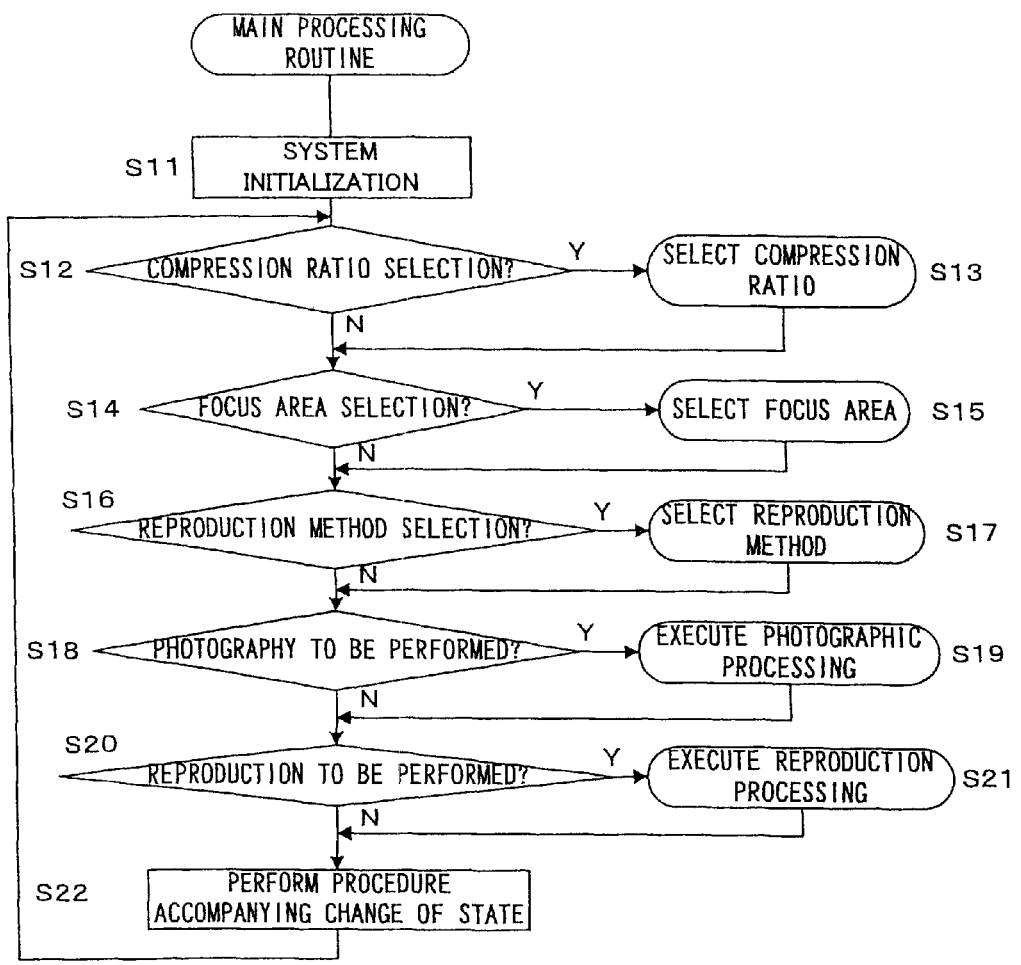
FIG. 6 is a flow chart showing the flow of a main processing routine.

The flow of a main processing routine which is executed by the CPU 312 of the above described electronic camera will now be explained with reference to the flow chart shown in FIG. 6. When a power supply switch, not shown in the figures, of this electronic still camera is turned ON, the CPU 312 reads in this main processing routine from the flash memory 309 and starts to execute it. First, in a step S11, the CPU 312 initializes the various blocks of the system, and then the flow of control proceeds to the next step S12. In this step S12, the CPU 312 performs a test in order to determine whether or not selection of compression ratio is to be performed. If upon the menu described above the item "picture quality mode" is indeed selected then the result of this decision in this step S12 is YES, and thus the flow of control proceeds to the next step S13, while on the other hand, if the item "picture quality mode" is not selected then the result of this decision in this step S12 is NO, and thus the flow of control skips to a step S14. In the step S13, the CPU 312 determines upon a compression ratio for data compression based upon the details of the picture quality mode setting, and then the flow of control proceeds to the step S14.

In this step S14, the CPU 312 performs a test in order to determine whether or not selection of focus area is to be performed. If the above described focus area selection switch 313a is being actuated then the result of this decision in this step S14 is YES, and thus the flow of control proceeds to the next step S15, while on the other hand, if the above described focus area selection switch 313a is not being actuated, then the result of this decision in this step S14 is NO, and thus the flow of control skips to a step S16. In the step S15, the CPU 312 changes the focus area used during A/F operation according to the actuation signal from the focus area selection switch 313a, and then the flow of control proceeds to the step S16.

In this step S16, the CPU 312 performs a test in order to determine whether or not selection of reproduction method is to be performed. If upon the menu described above the item "reproduction method" is indeed selected then the result of this decision in this step S16 is YES, and thus the flow of control proceeds to the next step S17, while on the other hand, if the item "reproduction method" is not selected, then the result of this decision in this step S16 is NO, and thus the flow of control skips to a step S18. In the step S17, the CPU 312 determines upon display of the main image or of a cutout image during reproduction mode based upon the details of reproduction method setting, and then the flow of control proceeds to the step S18.

In this step S18, the CPU 312 performs a test in order to determine whether or not the mode changeover switch is being actuated to the recording mode for taking a photograph. If the mode changeover switch is being actuated to the recording mode then the result of this decision in this step S18 is YES, and thus the flow of control proceeds to the next step S19, while on the other hand, if the mode changeover switch is not being actuated to the recording mode, then the result of this decision in this step S18 is NO, and thus the flow of control skips to a step S20. In the step S19, the CPU 312 performs recording processing to take the photograph by starting the execution of a program for the recording mode, and then the flow of control proceeds to the step S20.

In this step S20, the CPU 312 performs a test in order to determine whether or not the mode changeover switch is being actuated to the reproduction mode. If the mode changeover switch is being actuated to the reproduction mode then the result of this decision in this step S20 is YES, and thus the flow of control proceeds to the next step S21, while on the other hand, if the mode changeover switch is not being actuated to the reproduction mode, then the result of this decision in this step S20 is NO, and thus the flow of control skips to a step S22. In the step S21, the CPU 312 performs reproduction processing by starting the execution of a program for the reproduction mode, and then the flow of control proceeds to the step S22.

In this final step S22, the CPU 312 performs the procedure which accompanies change of state—for example it executes a power consumption reduction procedure if the camera has not been operated for a predetermined time period—and then the flow of control loops back to the step S12, to repeat the above described cycle.

Figure 7:
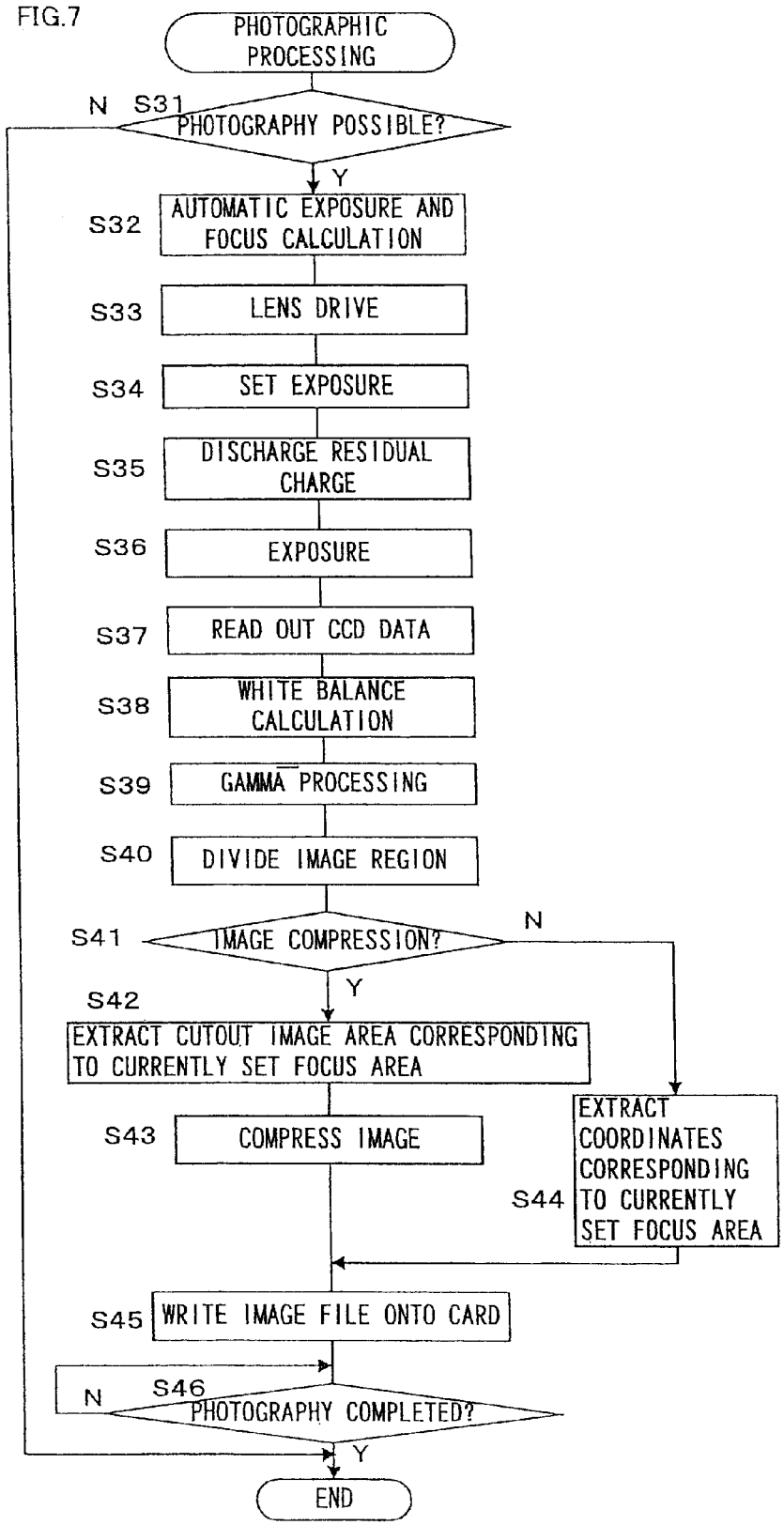
FIG. 7 is a flow chart showing the flow of a recording mode routine.

FIG. 7 is a flow chart showing the flow of a routine for recording mode which is executed by the CPU 312. In the first step S31, the CPU 312 makes a decision as to whether or not photography is possible. If the result of this decision is YES, so that photography is indeed possible, then the flow of control proceeds to the next step S32, while if the result of this decision is NO, so that photography is not possible (which may be for any of several reasons, such as for example that no card memory 308 is currently fitted to the camera or the like) then the flow of control passes to the end of this recording mode routine and the processing of FIG. 7 is terminated.

In the step S32, the CPU 312 performs exposure calculation using the results of photometry according to the "photometric method" which is currently set, and performs A/F calculation from the image data for the focus area which is currently set. In the next step S33, the CPU 312 drives the focus driver 303 based upon the results of the A/F calculation which has just been performed, and thus drives the focus lens of the photographic lens 301. In the next step S34, the CPU 312 performs exposure setting for the COD driver 303, based upon the results of the exposure calculation performed above. And in the next step S35, the CPU 312 drains any residual charge from the COD 302 by using the COD driver 303.

In the next step S36, the CPU 312 accumulates charge in the CCD 302, and then the flow of control proceeds to the next step S37. In this step S37, the CPU 312 reads out the accumulated charge in the CCD 302 via the CCD driver 303. In the next step S38, the CPU 312 makes the ASIC for image processing 306 perform white balance calculation, and in the next step S39, perform gamma correction processing. In the next step S40, the CPU 312 separates the frame of image data that has been captured into five portions which correspond to the five focus areas described above. In this case, for this division, it is sufficient only to obtain the memory addresses in the buffer memory 307 in which the image data is stored, at which the boundary data elements of the focus areas are stored.

In the next step S41, the CPU 312 decides whether or not image compression is to be performed. If the picture quality mode is set to any of "FINE", "NORMAL", or "BASIC", then the result of this decision is YES, and the flow of control proceeds to the next step S42, while if the picture quality mode is set to "HI" then the result of this decision is NO, and the flow of control is transferred to a step S44. In the step S42, the CPU 312 extracts the image data for the cutout region which corresponds to the focus area which is currently set from the one frame of image data, and then the flow of control proceeds to the next step S43.

In this step S43, the CPU 312 outputs a command to the ASIC for image processing 306 to compress this one frame of image data at the compression ratio which is currently set. When the data compression process has been completed the flow of control proceeds to the next step S45. In this step S45, the CPU 312 records in the card memory 308 this one frame of image data after the compression process and also the information for the cutout region which has been extracted. If in the above described step S42 the cutout image data was extracted, then the information for the cutout region is the cutout image data which was extracted. Furthermore, if in the step S44 which will be described hereinafter coordinates were extracted, then the information for the cutout region is these coordinates which have been extracted. And, in the final step S46, the CPU 312 makes a decision as to whether or not the photographic process has been completed, and if the result of this decision is that indeed photography has been completed then the processing of this routine is terminated, while on the other hand if the result of this decision is that the photographic process has not yet been completed, then the flow of control loops back to this step S46 again, thus to repeat the step S46 until the photographic process is finally completed.

On the other hand, if the result of the decision in the above described step S41 is NO, then the flow of control is transferred to the step S44, in which the CPU 312 extracts the coordinates which correspond to the focus area which is currently set, and then the flow of control is transferred to the step S45. By "coordinates" here is meant values which specify, when this one frame of image data is laid out in the memory space, the position at which the image data for the cutout region which corresponds to the currently set focus area is located within this memory space.

Figure 8:
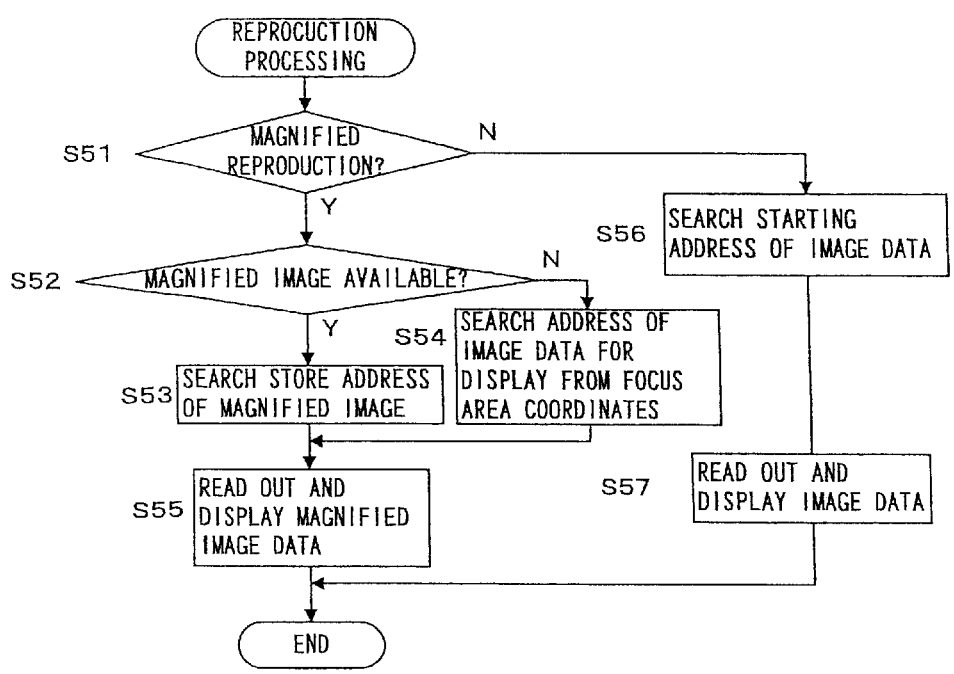
FIG. 8 is a flow chart showing the flow of a reproduction mode routine.

FIG. 8 is a flow chart showing the flow of a routine for reproduction mode which is executed by the CPU 312. In the first step S51, the CPU 312 takes a decision as to whether or not magnified reproduction is to be performed. If the current setting for "reproduction method" is "cutout image", then the result of this decision in the step S51 is YES and the flow of control proceeds to the next step S52, while, if the current setting for "reproduction method" is "main image", then the result of this decision in the step S51 is NO and the flow of control is transferred to a step S56. In the step S52, the CPU 312 takes a decision as to whether or not this magnified image to be displayed is recorded in the card memory 308. If the cutout image data is indeed recorded in the card memory 308 then the CPU 312 comes to a YES decision in this step S52 and the flow of control continues to the next step S53, while if the cutout image data is not recorded in the card memory 308 then the CPU 312 comes to a NO decision in this step S52 and the flow of control is transferred to the step S54.

In the step S53, the CPU 312 searches for the starting address of the cutout image data which is recorded in the card memory 308, and then the flow of control continues to the next step S55. In this step S55, the CPU 312 reads out the image data for the cutout region which is recorded in the storage address which has been found and displays it upon the LCD color monitor 310, and then the processing of the FIG. 8 routine is terminated.

If the result of the decision in the above described step S52 is NO then the flow of control is transferred to the step S54, in which the CPU 312 reads out the coordinates which correspond to the focus area from the card memory 308, and, using these coordinates which have been read out, finds the starting address in the one frame of image data which is recorded in the card memory 308 at which the data is stored which corresponds to the focus area; and then the flow of control proceeds to the step S55, already described.

If the result of the decision in the above described step S51 is NO then the flow of control is transferred to the step S56, in which the CPU 312 searches for the starting address of the one frame of image data which is recorded in the card memory 308, and then the flow of control continues to the next step S57. In this step S57, the CPU 312 reads out the one frame of image data which is recorded in the storage address which has been found and displays it upon the LCD color monitor 310, and then the processing of the FIG. 8 routine is terminated.

According to the first preferred embodiment of the present invention as described above, the following beneficial results are obtained.

(1) If the image data is to be recorded in the card memory 308 with no data compression (the picture quality mode is "HI"), then during the recording mode, when recording the image data in the card memory 308, only information which is necessary for reading out the cutout image data which corresponds to the focus area which is currently selected, i.e. the coordinates of the cutout image data, is extracted (in the step S44), and this information is recorded in the card memory 308 along with the non compressed image data for this one frame (in the step S45). During the reproduction mode, when performing display of the cutout image, the starting address at which the data which corresponds to the focus area which was selected at the time of photography is stored is searched from the coordinates of the cutout image data which are recorded in the card memory 308 (in the step S54), and, using this address, only the cutout image data is read out from the card memory 308 and is displayed upon the LCD color monitor 310. Accordingly, with this first preferred embodiment of the present invention, it is possible to shorten the time period which is required for display, as compared to the prior art case in which, after having read out the entire image data for one frame recorded in the card memory 308, only the cutout image data was displayed, since the amount of data which must be read out is reduced. As a result it becomes possible to check the state of focusing immediately, since it is possible immediately after photography to display upon the LCD color monitor 310 an image of the focus region which is currently set.

(2) On the other hand, if the image data is to be recorded in the card memory 308 using data compression (the picture quality mode is "FINE", "NORMAL", or "BASIC"), then during the recording mode, when recording the image data in the card memory 308, only the cutout image data is extracted from the one frame of image data (in the step S42) and this cutout image data is recorded without compression in the card memory 308 along with the image data after compression for this one frame (in the step S45). During the reproduction mode, when performing display of the cutout image, the address at which the cutout image data recorded in the card memory 308 is stored is searched (in the step S53), and only the cutout image data is read out from the card memory 308 and is displayed upon the LCD color monitor 310. Accordingly, with this first preferred embodiment of the present invention, it is possible to shorten the time period which is required for display, as compared to the prior art case in which, after having read out the entire image data after compression for one frame recorded in the card memory 308, only the cutout image data was displayed after decompression processing, since the amount of data which must be read out is reduced. As a result it becomes possible to check the photographic image immediately, since it is possible immediately after photography to display upon the LCD color monitor 310 an image of the focus region which is currently set.

In the above described step S45, the CPU 312 recorded in the card memory 308 one frame of image data after data compression, and information which specified the cutout region which was to be extracted. When in the step S42 the CPU 312 is recording in the card memory 308 the cutout image data which has been extracted as the information which specifies the cutout region, this cutout image data is recorded in the card memory 308 without compression, i.e. just as it is. Instead of this, it would also be possible, as an alternative, to record this cutout image data in the card memory 308 after compressing it, just as in the case of the full frame of image data. In this case, the data compression ratio at which the cutout image data is compressed should desirably be a compression ratio close to the compression ratio at which the full frame of image data is compressed.

Embodiment Two

In the case of an electronic still camera according to the second preferred embodiment of the present invention, during the recording mode, when recording the image data in the card memory 308, if the currently set "picture quality mode" is "BASIC", in other words if the data compression ratio is set to a high compression ratio, then the information for displaying the cutout image which is recorded in the card memory 308 together with the full frame of image data after compression is made to be position information (for example, coordinates in the memory space) of the image data for the cutout region.

Figure 9:
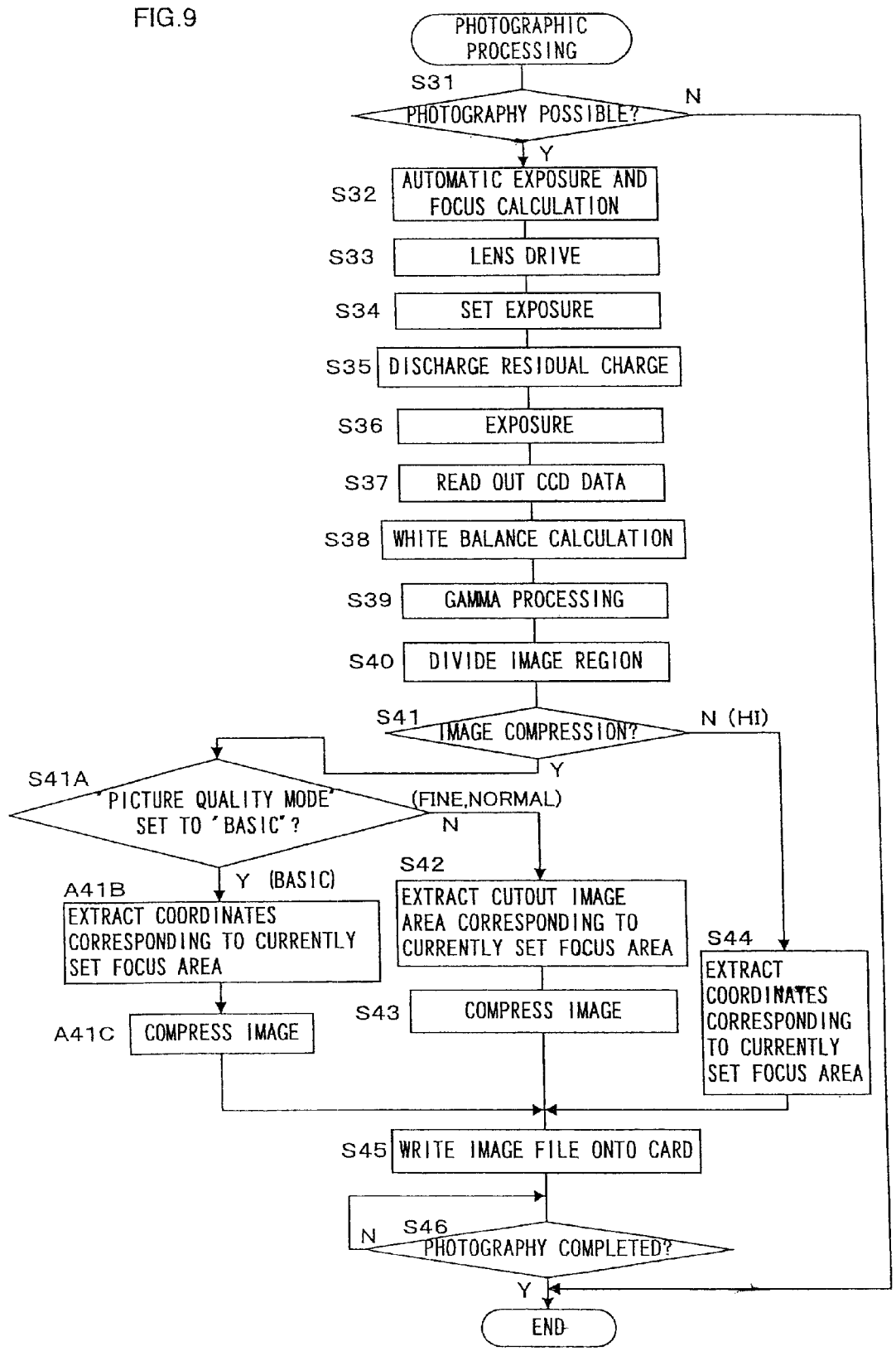
FIG. 9 is a flow chart showing the flow of a recording mode routine in a second preferred embodiment of the electronic camera of the present invention.

FIG. 9 is a flow chart showing the flow of a recording mode routine executed by the CPU 312 in the second preferred embodiment of the electronic camera of the present invention. The point of difference from the flow chart of FIG. 7 relating to the first preferred embodiment is that additional steps S41A, S41B, and S41C are present. These points of difference will now be explained.

In the step S41A to which the flow of control is transferred upon a YES decision from the step S41 of FIG. 9, the CPU 312 makes a decision as to whether or not the set "picture quality mode" is "BASIC". If the result of this decision is YES so that indeed the set "picture quality mode" is "BASIC", then the flow of control is transferred to a step S41B, while on the other hand if the result of this decision is NO so that the set "picture quality mode" is not "BASIC", then the flow of control is transferred to the step S42.

In the step S41B, the CPU 312 extracts the coordinates which correspond to the focus area which is currently set, and then the flow of control proceeds to a step S41C. By "coordinates" is meant values which specify the position at which the image data in the cutout region which corresponds to this currently set focus area is located, when this one frame of image data is laid out within the memory space. In the next step S41C, the CPU 312 outputs a command to the ASIC for image processing 306 which orders it to compress this one frame of image data at the predetermined compression ratio. When this data compression process has been completed the flow of control is transferred to the step S45. In this case, in the step S45, the CPU 312 records in the card memory 308 the one frame of image data after compression and also information specifying the extracted cutout region. This information specifying the cutout region is the coordinate data which has been extracted in the step S41B.

In the case of "BASIC" when the compression ratio is high, the length of the time period which is required for reading out the image data for one frame after compression which is recorded in the card memory 308 is short, since the amount of codes after the data compression process becomes small. Accordingly, when performing display of the cutout image in the reproduction mode, after having read out the one frame of image data after compression and having performed the decompression process upon it, the cutout image data is extracted based upon the information which specifies the cutout region, and display of the cutout region is performed. In the step S41B the information is extracted which is required for extracting the cutout image data after the decompression process in the reproduction mode, in other words the coordinates which correspond to the focus area.

On the other hand, in the case of "FINE" or "NORMAL" when the compression ratio is relatively low, the length of the time period which is required for reading out the image data for one frame after compression which is recorded in the card memory 308 is long, since the amount of codes after the data compression process is not greatly reduced as compared with the amount before compression. Accordingly, when performing display of the cutout image in the reproduction mode, only the cutout image data which is recorded separately from the one frame of image data is read out, so as to perform display of the cutout image. In the step S42, the cutout image data which corresponds to the focus area is extracted separately from the one frame of image data.

According to this second preferred embodiment of the present invention as explained above, the following beneficial results are obtained.

(1) If, in the step S41A where it is decided whether or not the data compression ratio is high (BASIC), the decision result is that the data compression ratio indeed is high, then (in the step S41B) the information which is required for reading out only the cutout image data which corresponds to the currently set focus area, in other words the coordinates of the cutout image data, is extracted, and is recorded (in the step S45) in the card memory 308 along with the image data for one frame after the compression process. When performing display of a cutout image in the reproduction mode, the starting address at which the data which corresponds to the focus area is stored is searched (in the step S54) from the coordinates of the cutout image data which are recorded in the card memory 308, and the cutout image data which is extracted from the image data which has been read out from the card memory 308 and has been decompressed, using the address which has been determined by this searching process, is displayed upon the LCD color monitor 310. If the compression ratio is high, the time period which is required for reading out the one frame of image data after compression which is recorded in the card memory 308 is short, and it is acceptable not to record the cutout image data for cutout image data display. As a result, it becomes possible to economize upon the amount of utilization of the card memory 308.

(2) On the other hand, if the data compression ratio is low (the picture quality mode is "FINE", or "NORMAL"), then, in the same way as in the first preferred embodiment of the present, invention described above, during the recording mode, when recording the image data in the card memory 308, only the cutout image data is extracted from the one frame of image data (in the step S42), and this information is recorded in the card memory 308 along with the image data after compression for this one frame (in the step S45). Accordingly, it becomes possible to check the focus state of the focus region immediately after photography, since it is possible to shorten the time period which is required for display when displaying the cutout image in the reproduction mode.

In the above explanation, "checking the focus state" includes the processes of checking whether or not the main photographic subject is properly in focus, checking upon blurring of the background to the main photographic subject, checking the depth of the photographic field, and the like.

Although the above explanation was made in terms of selecting the focus area among the five possible focus areas A through E which are determined upon in advance, it would also be possible to select any arbitrary region within the photographic field. In such a case, it would be arranged for a region of the cutout image data to be set corresponding to this arbitrary focus area which has been selected.

Furthermore, although the above explanation was made in terms of setting the region of the cutout image data to correspond to the focus area, it would also be acceptable to set it to correspond to a region which was set by the "photometric method", in other words to the A/E region, instead of this focus area.

Yet further, it would also be acceptable to make it possible to select the region for the cutout image data to be any region within the photographic field, without any relation to the focus area. In such a case, it would be arranged to set the region for the cutout image data to correspond to any area which was selected.

It would also be acceptable to make it possible to check the exposure or the white balance adjustment, instead of the focal state. In such a case the user would check, from the cutout image which was being displayed upon the LCD color monitor 310, upon the presence or absence of white clipping or black clipping of the main photographic subject, or upon the presence or absence of color fogging due to poor white balance adjustment.

Although the present invention has been explained in an example of an electronic still camera. However, the invention is not limited to the example. The present invention can be applied to a cellular phone, a personal computer or the like which is provided with a CCD camera. In other words, the invention can be applied to all types of image-capturing device in which an image-capturing element such as a CCD is provided and the captured image data are recorded in a recording medium such as a memory.

Figure 10:
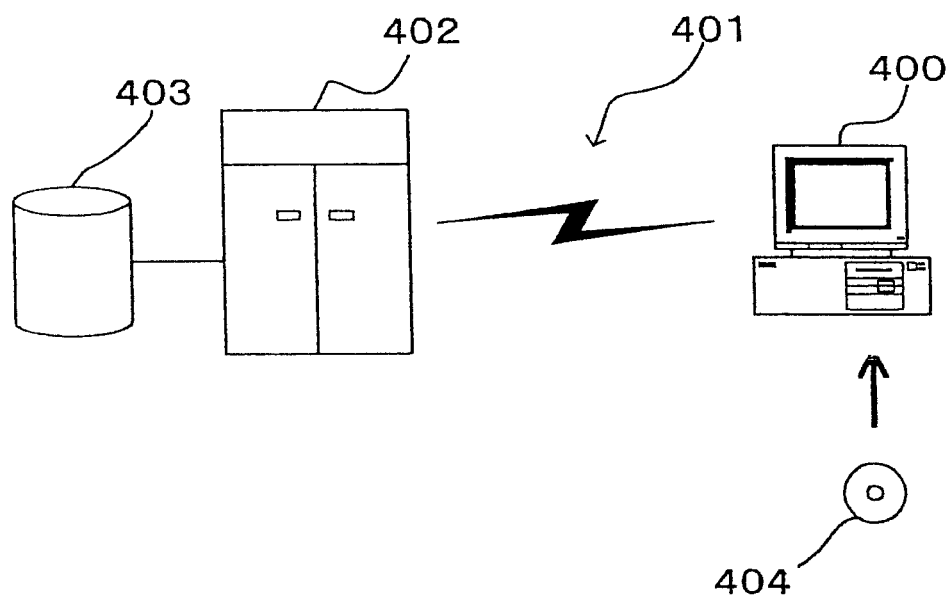
FIG. 10 is a figure illustrating that a program is provided to a personal computer.

In case that the invention is applied to a personal computer or the like, the control program mentioned above can be provided via a recording medium such as a CD-ROM or a data signal such as Internet. FIG. 10 illustrates how this may be achieved. A personal computer 400 receives the program via a CD-ROM 404. The personal computer 400 has a function of connecting with a telecommunication line 401. A computer 402 is a server computer which provides the program mentioned above and stores the program in a recording medium such as a hard disk 403. The telecommunication line 401 may be a telecommunication line for connection with the Internet, for personal computer communication or the like or it may be a dedicated telecommunication line. The computer 402 reads out the program stored in the hard disk 403, and transmits the program to the personal computer 400 via the telecommunication line 401. In other words, the program is embodied in a carrier wave as a data signal and is transmitted via the telecommunication line 401. Thus, the program is provided as various kinds of computer-readable computer program product, such as a recording medium, a carrier wave and the like.

What is claimed is:

1. An image-capturing device, comprising:
    an image-capturing element which captures an image of a photographic subject and outputs image data;
    a data extraction device which extracts data corresponding to a region designated in advance within the image data outputted from said image-capturing element;
    a recording device which records said extracted data and said image data into a recording medium individually;
    a reproduction device which reads out said extracted data from the recording medium; and
    a display control device which outputs an image signal to a display device, so as to display an image according to said extracted data read out by said reproduction device.

2. The image-capturing device according to claim 1, wherein
    said data extraction device extracts a number of items of data approximately equal to a number of display dots of the display device which displays the image according to said extracted data.

3. The image-capturing device according to claim 1, wherein
    said region which is designated in advance is a region which is used for focusing.

4. An image-capturing device, comprising:
    an image-capturing element which captures an image of a photographic subject and outputs image data;
    a data extraction device which extracts data corresponding to a region designated in advance within the image data outputted from said image-capturing element; and
    a recording device which records said extracted data and said image data into a recording medium individually.

5. The image-capturing device according to claim 4, wherein
    said data extraction device extracts a number of items of data approximately equal to a number of display dots of the display device which displays the image according to said extracted data.

6. The image-capturing device according to claim 4, wherein
    said region which is designated in advance is a region which is used for focusing.

7. An image display control method, comprising:
    a reproduction process which reads out at least one of extracted data, which have been extracted from image data which was obtained by an image-capturing device, so as to correspond to a region designated in advance and recorded, and a pair of information specifying a position of said region and said image data; and
    a display control process which controls a display device so as to display an image according to said extracted data when said extracted data is read out by said reproduction process, and to display an image according to a portion of said image data corresponding to said information when the pair of said information and said image data are read out by said reproduction process.

8. A non-transitory computer recording medium containing an image display program, the image display program comprising:
    a reproduction process which reads out at least one of extracted data, which have been extracted from image data which was obtained by an image-capturing device, so as to correspond to a region designated in advance and recorded, and a pair of information specifying a position of said region and said image data; and
    a display control process which controls a display device so as to display an image according to said extracted data when said extracted data is read out by said reproduction process, and to display an image according to a portion of said image data corresponding to said information when the pair of said information and said image data are read out by said reproduction process.

9. An image-capturing control method, comprising:
    outputting image data after capturing an image of a photographic subject by an image-capturing element;
    extracting data corresponding to a region designated in advance within said outputted image data;
    recording said extracted data and said image data into a recording medium individually;
    reading out said extracted data from the recording medium when reproducing; and
    controlling a display device so as to display an image according to said read out extracted data.

10. An image-capturing control method, comprising:
    outputting image data after capturing an image of a photographic subject by an image-capturing element;
    extracting data corresponding to a region designated in advance within said outputted image data; and
    recording said extracted data and said image data into a recording medium individually.

* * * * *